(12) United States Patent
Huang et al.

(10) Patent No.: US 10,781,061 B2
(45) Date of Patent: Sep. 22, 2020

(54) AUTOMATIC LOADING APPARATUS AND APPLICATION OF THE SAME

(71) Applicant: FORMOSA HEAVY INDUSTRIES CORPORATION, Kaohsiung (TW)

(72) Inventors: Yu-Feng Huang, Kaohsiung (TW); Ting-Wang Yi, Kaohsiung (TW); Yi-Chien Chen, Kaohsiung (TW)

(73) Assignee: FORMOSA HEAVY INDUSTRIES CORPORATION, Kaohsiung (TW)

(*) Notice: Subject to any disclaimer, the term of this patent is extended or adjusted under 35 U.S.C. 154(b) by 76 days.

(21) Appl. No.: 16/137,501

(22) Filed: Sep. 20, 2018

(65) Prior Publication Data

US 2020/0039767 A1    Feb. 6, 2020

(30) Foreign Application Priority Data

Aug. 1, 2018 (TW) .............................. 107126759 A (51) Int. Cl.
*B65G 67/20* (2006.01)
*B65G 69/28* (2006.01)
*B65G 67/04* (2006.01)

(52) U.S. Cl.
CPC ............. *B65G 67/20* (2013.01); *B65G 67/04* (2013.01); *B65G 69/2864* (2013.01)

(58) Field of Classification Search
CPC ..... B65G 67/04; B65G 67/20; B65G 69/2864
USPC ............................................... 414/398, 400
See application file for complete search history.

(56) References Cited

U.S. PATENT DOCUMENTS

| | | | | |
|---|---|---|---|---|
| 3,710,961 A * | 1/1973 | Bornstein | ............. | B65G 63/025 |
| | | | | 414/396 |
| 3,727,777 A * | 4/1973 | Hanson | ................. | B65G 67/20 |
| | | | | 414/400 |
| 3,857,501 A * | 12/1974 | Lassig | .................... | B65G 67/20 |
| | | | | 414/349 |
| 4,832,559 A * | 5/1989 | Gebbardt | ............... | B65G 67/20 |
| | | | | 414/398 |
| 4,844,681 A * | 7/1989 | Pierre | ................... | B65G 67/20 |
| | | | | 414/398 |
| 5,054,987 A * | 10/1991 | Thornton | ............... | B65G 67/20 |
| | | | | 414/400 |
| 5,186,596 A * | 2/1993 | Boucher | ................ | B65G 67/20 |
| | | | | 414/400 |
| 5,374,151 A * | 12/1994 | Matthews | .............. | B65G 67/20 |
| | | | | 414/399 |

(Continued)

FOREIGN PATENT DOCUMENTS

| CN | 101341084 A | 1/2009 |
|---|---|---|
| CN | 103708242 A | 4/2014 |

(Continued)

*Primary Examiner* — James Keenan (74) *Attorney, Agent, or Firm* — CKC & Partners Co., LLC (57) ABSTRACT

The present invention provides an automatic loading apparatus including a loading platform and a transfer plate. The transfer plate includes a rolling portion and a ramp portion. The rolling portion includes plural roller modules. Each of the roller modules includes a metal frame and plural upper rollers and lower rollers disposed in the metal frame. An upper surface of the transfer plate is made up of the upper rollers, and a lower surface of the transfer plate is made up of the lower rollers. The ramp portion is connected to the rolling portion and arranged on one end of the transfer plate.

13 Claims, 10 Drawing Sheets

(56) References Cited

U.S. PATENT DOCUMENTS

| | | | |
|---|---|---|---|
| 7,695,235 B1 * | 4/2010 | Rallis | B65G 67/20 414/400 |
| 8,251,634 B2 | 8/2012 | Kauhanen | |
| 10,099,872 B2 * | 10/2018 | Auvinen | B65G 67/20 |
| 10,618,753 B2 * | 4/2020 | Hopkins | B65G 67/20 |
| 2004/0086363 A1 * | 5/2004 | Rohr | B65G 67/20 414/398 |
| 2007/0140819 A1 * | 6/2007 | Piveteau | B65G 67/20 414/396 |
| 2007/0201971 A1 * | 8/2007 | Meijer | B65G 67/20 414/679 |

FOREIGN PATENT DOCUMENTS

| | | | | |
|---|---|---|---|---|
| CN | 204399926 U | 6/2015 | | |
| CN | 204777750 U | 11/2015 | | |
| CN | 206645411 U | 11/2017 | | |
| DE | 102010028821 A1 * | 2/2011 | | B65G 67/20 |
| GB | 2059379 A * | 4/1981 | | B65G 67/20 |
| JP | 11-130268 A | 5/1999 | | |
| JP | 2009083993 A | 4/2009 | | |
| WO | 2012074376 A1 | 6/2012 | | |
| WO | WO-2017187017 A1 * | 11/2017 | | B65G 67/20 |

\* cited by examiner

AUTOMATIC LOADING APPARATUS AND APPLICATION OF THE SAME

RELATED APPLICATIONS

This application claims priority to Taiwan Application Serial Number 107126759, filed Aug. 1, 2018, which is herein incorporated by reference.

BACKGROUND

Field of Invention

The present invention relates to an automatic loading apparatus and an application thereof. More particularly, the present invention relates to an automatic loading apparatus including a transfer plate and a loading platform and an application thereof.

Description of Related Art

Nowadays, a common method for loading cargos is manually stacking the cargos by a stacker. However, manually stacking causes higher personnel and time costs and a safety issue.

Therefore, a known method for loading the cargos is performed by disposing the cargos and a pallet on a flexible and thin transfer plate of an apparatus, and pushing the transfer plate and the cargos into a cargo container by a push device after the transfer plate is occupied by the cargos. Then, the transfer plate is moved out by using the push device. The thin transfer plate can effectively use a space of the cargo container and is able to be conformal to an uneven bottom surface in the cargo container; however, it is difficult to push the flexible transfer plate. Especially, when the cargos loaded on the transfer plate are heavy, pushing the flexible transfer plate may be much more difficult.

There is another apparatus including a transfer plate having a flat portion and a rolling portion alternately arranged. However, when the heavier cargos are loaded, a movement of the cargos on the flat portion is difficult, causing difficulty in loading the cargos.

According to the deficiencies, a rigid transfer plate that is able to be conformal to the bottom surface in the cargo container is required for pushing the transfer plate. Furthermore, an automatic loading apparatus including the transfer plate is also required.

SUMMARY

An aspect of the present invention provides an automatic loading apparatus, which reduce the personnel and time costs of loading cargos by using a specifically designed transfer plate and a loading platform. Furthermore, a space of the cargo container may be used efficiently.

The other aspect of the present invention provides a method for loading cargos, which applies the automatic loading apparatus.

According to the aspects of the present invention, an automatic loading apparatus is provided. In some embodiments, the automatic loading apparatus includes a loading platform and a transfer plate. The transfer plate has an upper surface and a lower surface. The transfer plate is disposed on the loading platform by the lower surface. The transfer plate includes a rolling portion and a ramp portion. The rolling portion includes plural roller modules. Each of these roller modules includes a metal frame, and plural upper rollers and plural lower rollers disposed in the metal frame. The upper surface is made up of the upper rollers, and the lower surface is made up of the lower rollers. The ramp portion is connected to the roller portion and disposed on one end of the transfer plate.

According to some embodiments of the present invention, plural roller plates are made up of the roller modules, and the roller plates are adjoinedly connected to each other along a direction perpendicular to an extending direction of the transfer plate.

According to some embodiments of the present invention, each of the roller plates includes plural roller strips, and each of the roller strips is made up of the roller modules, each of which is hingedly jointed to one another. One of roller strips is fixed to an adjacent one of the roller strips arranged at a distance from the one of the roller strips.

According to some embodiments of the present invention, each of roller modules hingedly jointed to one another in the each of the roller strips forms a rotatable joint.

According to some embodiments of the present invention, a length of the ramp portion is 1000 mm to 2000 mm.

According to some embodiments of the present invention, the loading platform includes a main body portion, a driving device, plural devices for adjusting a position of the main body portion and a loading restraint. The driving device is disposed in the main body portion. The other end of the transfer plate opposing the ramp portion is connected to the driving device. The devices for adjusting the position of the main body portion are disposed under the main body portion. The loading restraint is disposed on the main body portion near the end of the transfer plate on which the ramp portion is disposed.

According to some embodiments of the present invention, each of the devices for adjusting the position of the main body portion includes a laterally-moving unit and a vertically-moving unit.

According to some embodiments of the present invention, the driving device is a drag chain device, the drag chain device includes at least one drag chain, and the other end of the transfer plate is fixed to the at least one drag chain.

According to some embodiments of the present invention, the automatic loading apparatus further includes a conveyor. The conveyor is disposed on the other end of the transfer plate opposing to the ramp portion. The conveyor includes a push bar.

According to some embodiments of the present invention, the automatic loading apparatus further includes an alignment system disposed above the loading platform.

According to the aspects of the present invention, a method for loading cargos is provided. In some embodiments, the method includes the following steps. First, the automatic loading apparatus is provided. Then, a cargo container is driven to approach the automatic loading apparatus. The automatic loading apparatus includes a loading platform and a transfer plate disposed on the loading platform, and the cargo container is located at one end of the transfer plate along an extending direction of the transfer plate. Then, a relative position of the cargo container and the automatic loading apparatus is obtained. Next, the relative position is adjusted such that the cargo container is aligned with the automatic loading apparatus. Then, the transfer plate and cargos on the transfer plate are moved into the cargo container. Thereafter, a loading restraint is arranged on an opening of the cargo container. Afterward, the transfer plate is moved out from the cargo container, thereby remaining the cargos in the cargo container.

According to some embodiments of the present invention, moving the transfer plate into the cargo container further includes a height of the loading platform.

BRIEF DESCRIPTION OF THE DRAWINGS

The invention can be more fully understood by reading the following detailed description of the embodiment, with reference made to the accompanying drawings as follows.

DETAILED DESCRIPTION

A purpose of the present invention provides an automatic loading apparatus, and a method of loading cargos using the automatic loading apparatus. Particularly, the automatic loading apparatus includes a transfer plate that can move into and out from a cargo container, so as to automatically loading a great amounts of the cargos into the cargo container. The automatic loading apparatus of the present invention is advantageous to reduce a personnel cost and a time cost for loading the cargos, and effectively use a space of the cargo container to accommodate more cargos.

Figure 1:
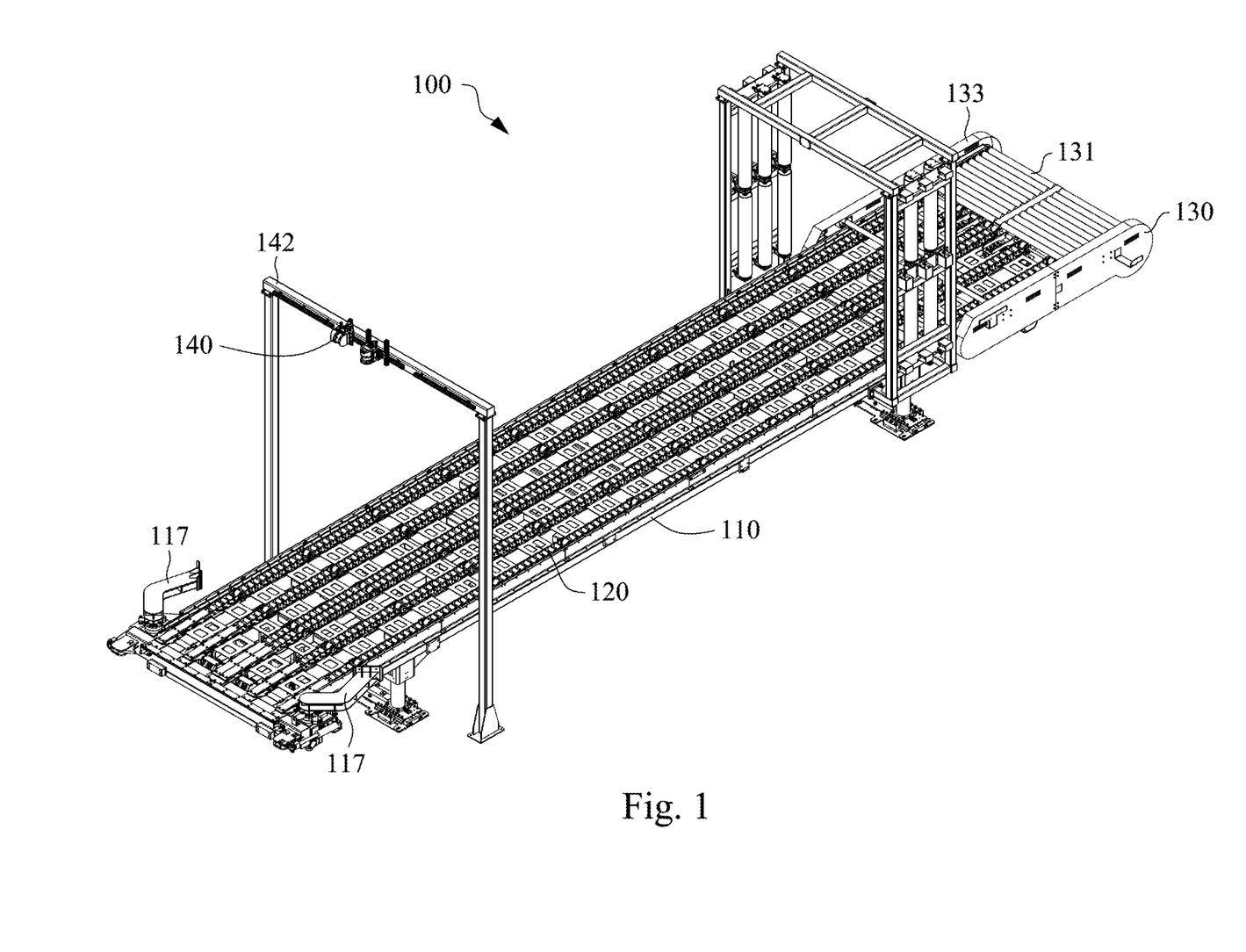
FIG. 1 is a 3-D view of an automatic loading apparatus in accordance with some embodiments of the present invention.

FIG. 1 is a 3-D view of an automatic loading apparatus in accordance with some embodiments of the present invention. As shown in FIG. 1, the automatic loading apparatus 100 includes a loading platform 110 and a transfer plate 120. In some embodiments, the automatic loading apparatus 100 may further include a conveyor 130. In some other embodiments, the automatic loading apparatus 110 may further include an alignment system 140. Descriptions of each unit of the automatic loading apparatus 100 are provided as follows.

Figure 2A:
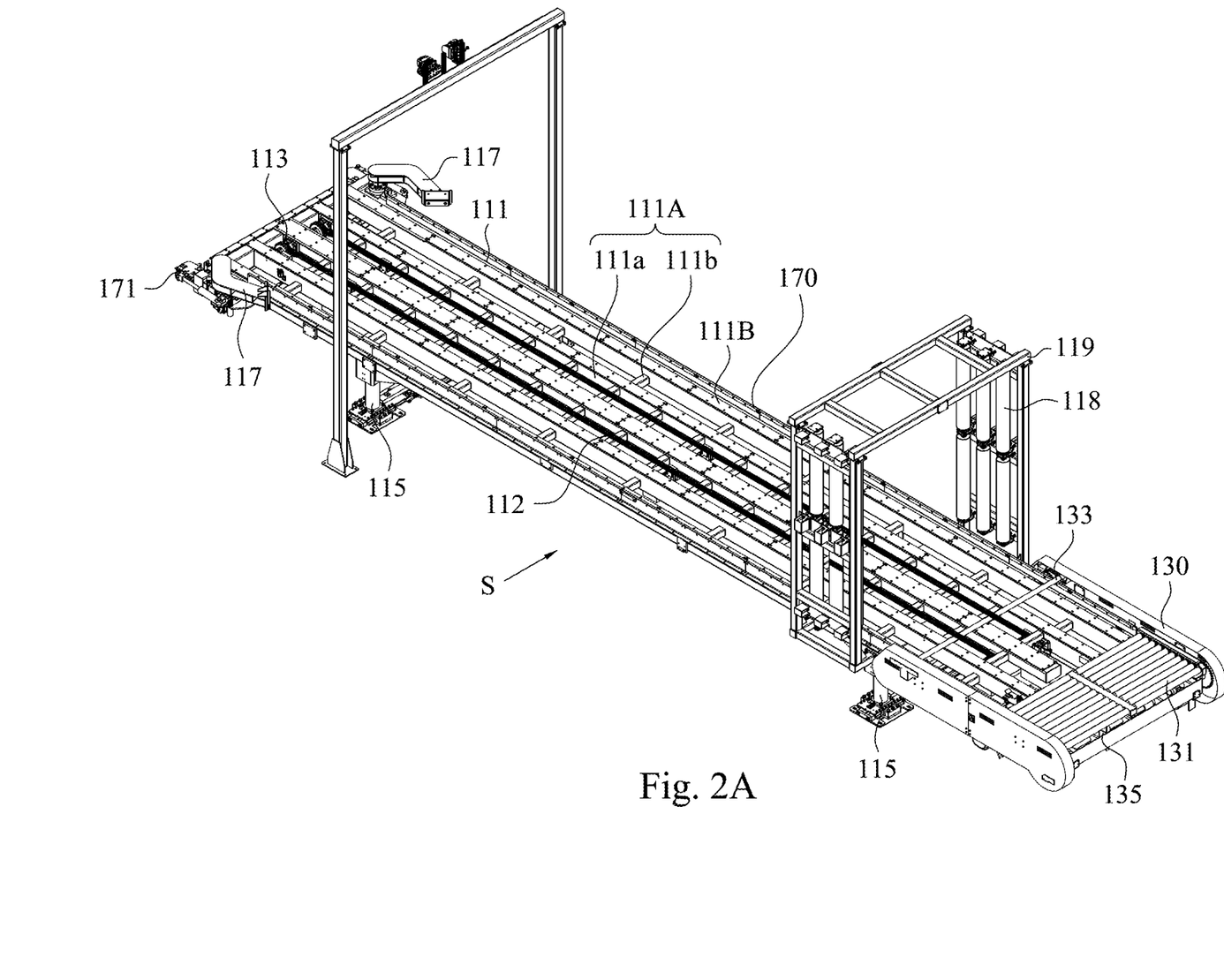
FIG. 2A is a 3-D view of a loading platform in accordance with some embodiments of the present invention.

FIG. 2A is a 3-D view of a loading platform in accordance with some embodiments of the present invention. As shown in FIG. 2A, in some embodiments, the loading platform 110 may include a main body portion 111, a driving device 113, plural devices 115 for adjusting a position of the main body portion 111, and a loading restraint 117. The driving unit 113 is disposed in the main body portion 111. The devices 115 for adjusting the position of the main body portion 111 are disposed under the main body portion 111. And, the loading restraint 117 is disposed on one end of the main body portion 111.

As shown in FIG. 2A, the main body portion 111 is a platform having an accommodating space. In the accommodating space, the main body portion 111 further includes a supporting structure 111A. The supporting structure 111A includes plural longitudinal elements 111a bridging two ends of the main body portion 111, and plural lateral elements 111b bridging two sides of the main body portion 111. The longitudinal elements 111a are perpendicular to the lateral elements 111b, and the longitudinal elements 111a are interlocked with the lateral elements 111b. In some embodiments, a hollowed-out plate 111B may be further disposed on the supporting structure 111A. The hollowed-out plate 111B is overlapped with the longitudinal elements 111a, so as to provide a larger supporting area of the loading platform 110.

Figure 4:
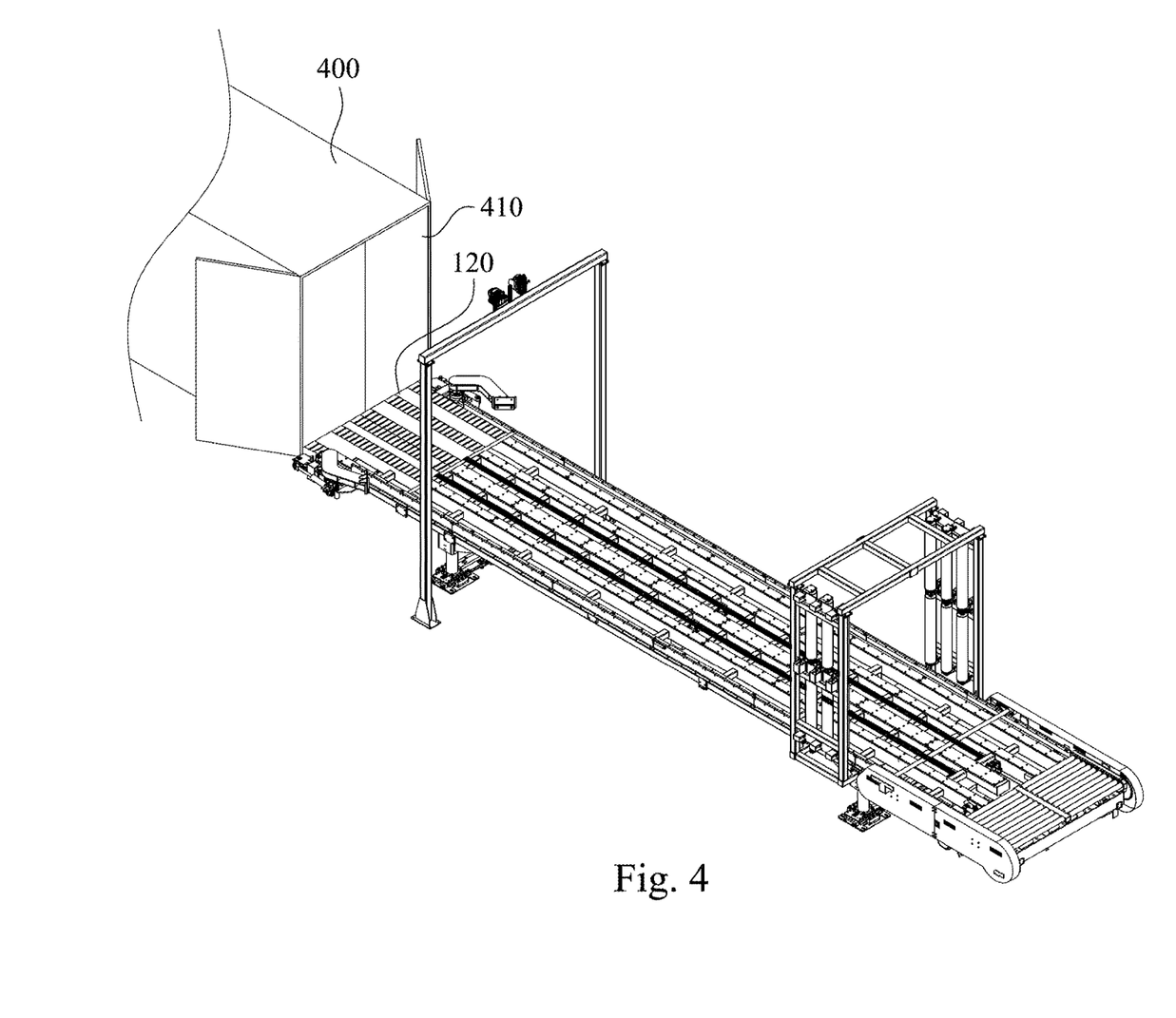
FIG. 4 is a schematic view for loading cargos by an automatic loading apparatus.

In some embodiments, the driving device 113 is disposed in the accommodating space, and is exposed from a gap between every two of the longitudinal elements 111a. The driving device 113 is connected to the transfer plate 120, so as to drive the transfer plate 120 to move in and move out from a cargo container 400 (FIG. 4). In some embodiments, the driving device 113 may be a drag chain device. The drag chain device includes at least one drag chain and a winching mechanism that winches the drag chain 112. The winching mechanism may clockwise or counterclockwise winch the drag chain 112 (e.g. viewed from a sight S).

Figure 2B:
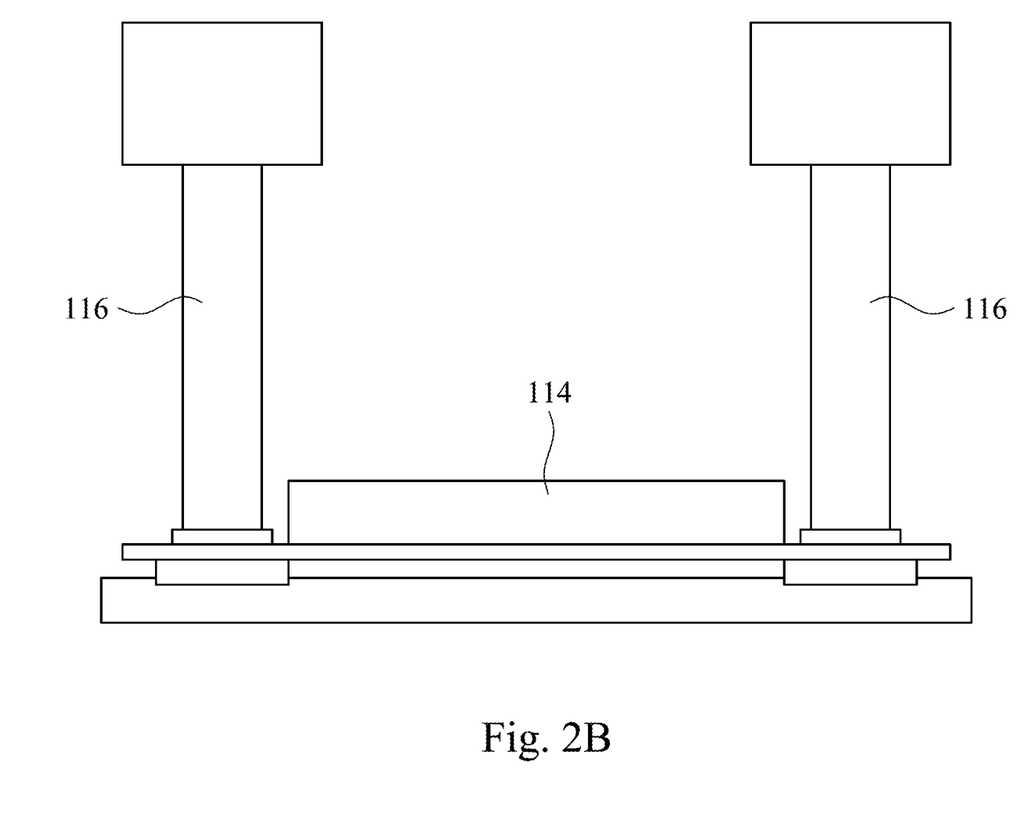
FIG. 2B is a front view of devices for adjusting a position of a loading platform in accordance with some embodiments of the present invention.

FIG. 2B is a front view of devices for adjusting a position of a loading platform in accordance with some embodiments of the present invention. In some embodiments, the loading platform 110 may include two devices 115 for adjusting the position. The two devices 115 for adjusting the position may be, for example, supporting bases of the loading platform 110. The two devices 115 may respectively disposed on the two ends of the loading platform 110. Each of the devices 115 for adjusting the position may include a laterally-moving unit 114 and vertically-moving units 116. In some examples, the vertically-moving units 116 may respectively be two vertical supporting columns arranged under the main body portion 111, in which each of the vertically-moving units 116 may have a lifting mechanism which is hydraulically, pneumatically or electrically driven. In some examples, the laterally-moving unit 114 is connected to the two vertical supporting columns (i.e. the vertically-moving units 116), and the two vertical supporting columns are arranged on two ends of the laterally-moving unit 114. The laterally-moving unit 114 may have a laterally-moving mechanism which is hydraulically, pneumatically or electrically driven. Therefore, the laterally-moving unit 114 may adjust a lateral position of the loading platform 110, and the vertically-moving unit 116 may adjust a vertical position of the loading platform 110, so as to improve the alignment of the transfer plate 120 with the cargo container 400. In some embodiments, when a lateral adjustment is performed, the laterally-moving unit 114 of each of the two devices 115 for adjusting the position causes a same lateral displacement to the loading platform 110. In some embodiments, when a vertical adjustment is performed, the vertically-moving units 116 of each of the two devices 115 for adjusting the position cause a same or different vertical displacement to the loading platform 110. In other embodiments, each of the devices 115 for adjusting the position has only one vertically-moving unit 116, in which the vertically-moving unit 116 may be disposed in a center of the laterally-moving unit 114 and supports the main body portion 111 of the loading platform 110.

In some embodiments, the loading restraint 117 is disposed on one end of the loading platform 110 that is near the ramp portion 124 (FIG. 3A) of the transfer plate 120. When the transfer plate 120 moves out from the cargo container 400, the loading restraint 117 may be used to leave the cargos in the cargo container 400 but not moves out from the cargo container 400 together with the transfer plate 120. In some examples, the loading restraint 117 may be a pair of cargo restraining arms, as shown in FIG. 1 and FIG. 2A. The pair of the cargo restraining arms are respectively disposed on two sides of the main body portion 111 and are rotatable, so as to arrange the cargo restraining arms on an opening of the cargo container 400 when the transfer plate 120 moves out, and the cargo restraining arms does not impede the opening when the cargos are being loaded. In other examples, the loading restraint 117 may be a plate or a rod that can be lifted.

In some embodiments, the loading platform 110 may further include a width restriction device 119. The width restriction device 119 may disposed on the other end of the main body portion 111 that opposes to the loading restraint 117. In some embodiments, the width restriction device 119 crosses two sides of the main body portion 111, and the width restriction device 119 has plural rolling columns 118 on each of the two sides. In some examples, when the cargos pass through the width restriction device 119, a stack of the cargos 410 (FIG. 4) may be adjusted, so as to stack the cargos 410 on the transfer plate 120 more neatly.

In some other embodiments, a guide element 170 may be respectively disposed on each of the two sides of the main body portion 111 of the loading platform 120. When the transfer plate 120 is moving on the loading platform 110, the guide element 170 may stabilize the transfer plate 120 to move in a desired direction and avoid divergence from the desired direction during the movement of the transfer plate 120.

In some still other embodiments, a latch device 171 may be arranged on the end of the loading platform 110 on which the loading restraint 117 is disposed, and the latch device 171 is disposed under the main body portion 111. The latch device 171 may be connected to a truck for transporting the cargo container 400. The connection of the latch device 171 to the car is advantageous for loading the cargos.

Figure 3A:
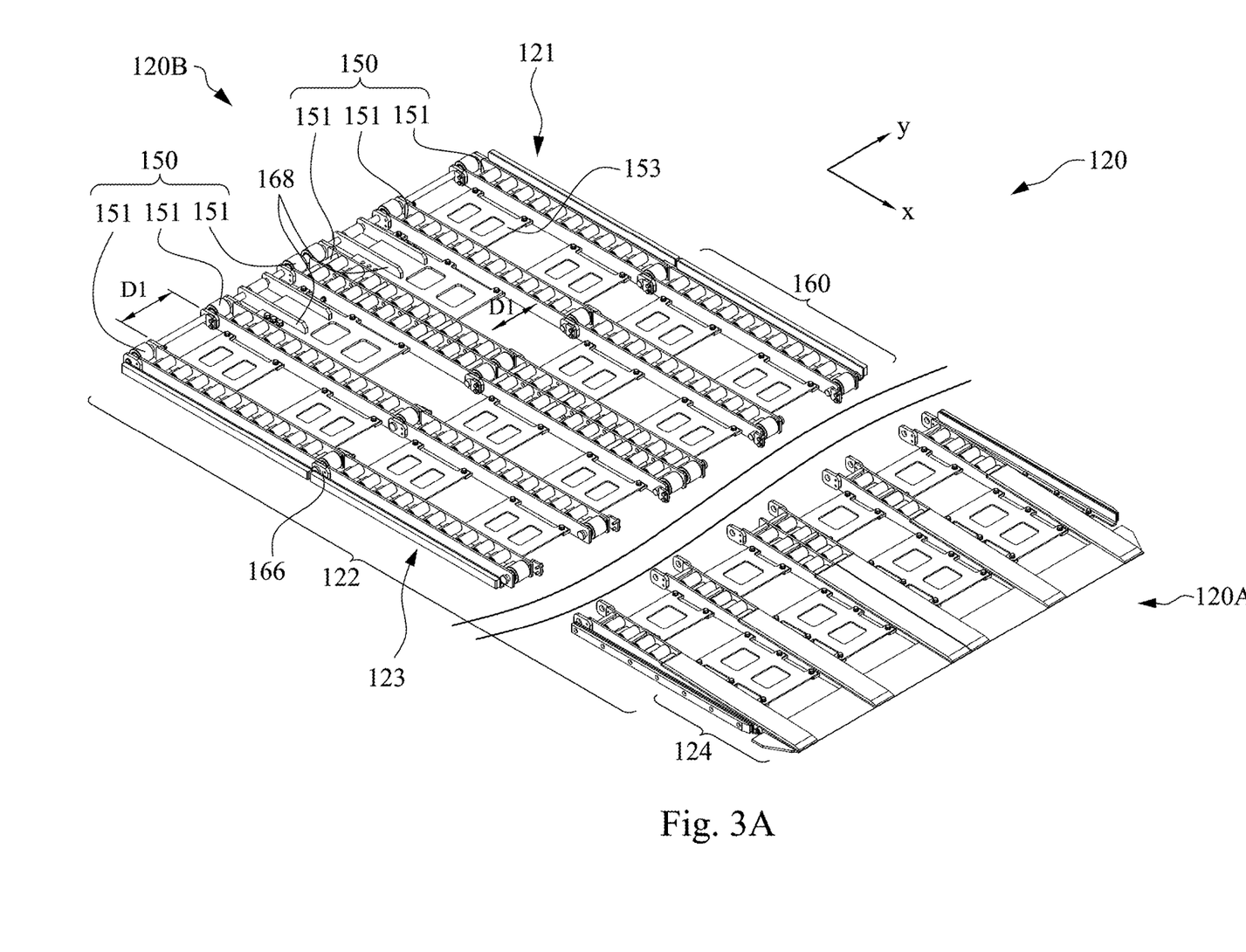
FIG. 3A is a 3-D view of a transfer plate in accordance with some embodiments of the present invention.
Figure 3B:
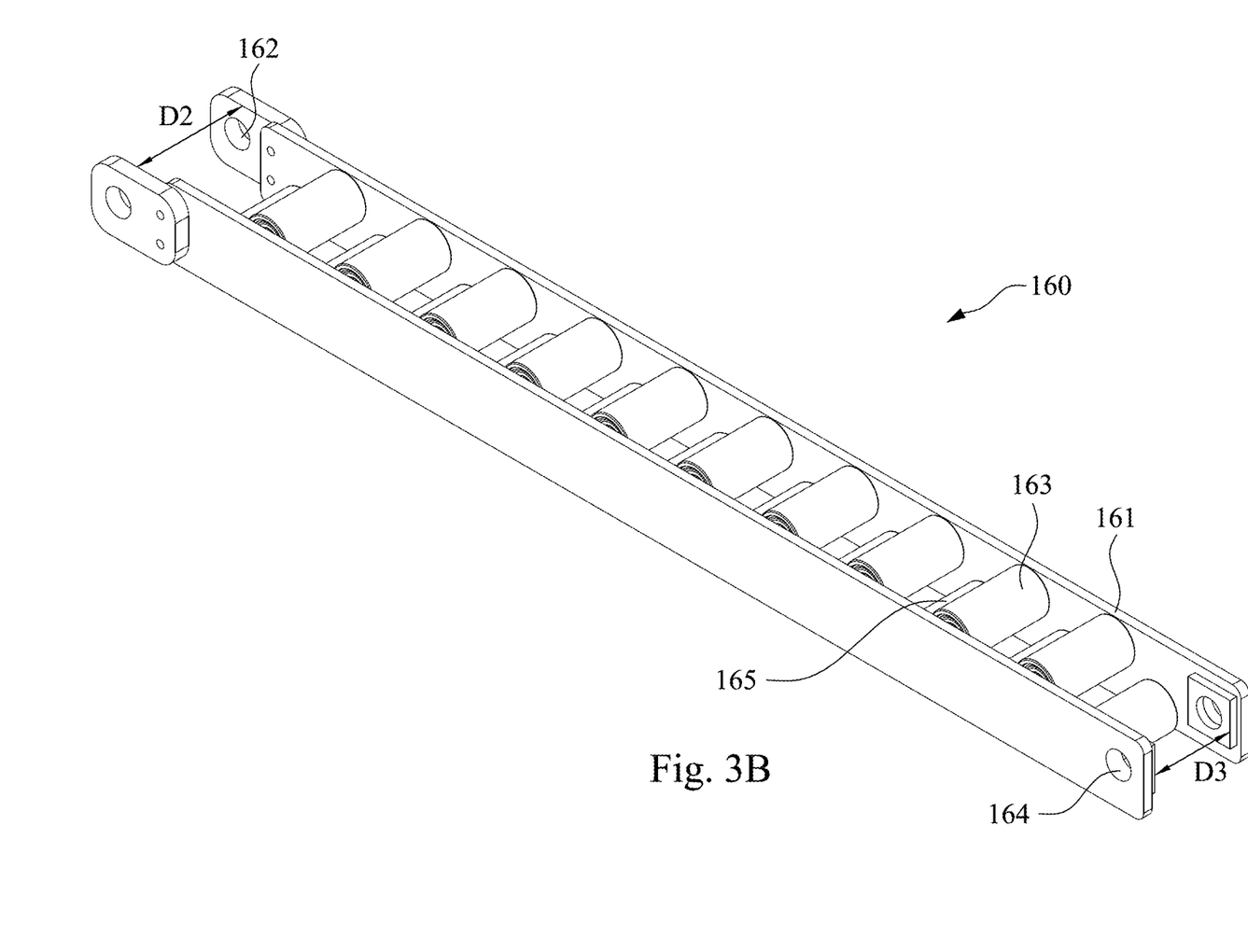
FIG. 3B is a 3-D view of a roller module of a transfer plate in accordance with some embodiments of the present invention.

FIG. 3A is a 3-D view of a transfer plate in accordance with some embodiments of the present invention. FIG. 3B is a 3-D view of a roller module of a transfer plate in accordance with some embodiments of the present invention. In some embodiments, the transfer plate 120 includes a rolling portion 122 and a ramp portion 124. The rolling portion 122 includes plural roller modules 160, as shown in FIG. 3B. Each of the roller modules 160 includes a metal frame 161, and plural upper rollers 163 and plural lower rollers 165 disposed in the metal frame 161. In some examples, the upper rollers 163 and the lower rollers 165 may be respectively fixed on the metal frame 161 using screws (not shown). In other embodiments, the upper rollers 163 and the lower rollers 165 may be arranged in the metal frame using other common methods, and there is no special limitation for the fixation of the rollers in the present invention. An upper surface 121 of the transfer plate 120 is made up of the upper rollers 163, and a lower surface 123 of the transfer plate 120 is made up of the lower rollers 165. In some embodiments, the upper rollers 163 and the lower rollers 165 are substantially rollers having a same diameter. However, in other embodiments, dimensions of the upper rollers 163 and the lower rollers 165 may be different. In one example, a number of the upper rollers 163 may be less than a number of the lower rollers 165. In other examples, the number of the upper rollers 163 may be greater than or equal to the number of the lower rollers 165.

In some embodiments, plural roller plates 150 are made up of the roller modules 160. The roller plates 150 are adjoinedly connected to each other along a direction Y perpendicular to an extending direction X of the transfer plate 120, as shown in FIG. 2A. In other embodiments, each of the roller plates 150 includes plural roller strips 151. Each of the roller strips is made up of the roller modules 160, each of which is hingedly jointed to one another. One of roller strips 151 is fixed to an adjacent one of the roller strips 151 arranged at a distance D1 from the one of the roller strips. This configuration is beneficial for reducing a weight of the transfer plate 120, so as to improve mobility of the transfer plate 120. In some examples, the metal frame 161 of one roller strip 151 may be connected and fixed to the metal frame 161 of the adjacent roller strip 151 by using screws and plural fixing elements 153.

In some embodiments, as shown in FIG. 3B, two ends of the metal frame 161 of every roller module 160 respectively include outer holes 162 and inner holes 164 for hinge joint. In one roller module 160, a distance D2 between the two outer holes 162 is a little greater than a distance D3 between the two inner holes 164. A difference of the distance D2 and the distance D3 enables hinge joint of two adjacent roller modules 160 along the extending direction X of the transfer plate 120. In one example, the outer holes 162 of one of the roller modules 160 are aligned with the inner holes 164 of the other one of the roller modules 160, and a shaft may be simultaneously disposed through the outer holes 162 and the inner holes 164, so as to make up the roller strips 151.

In some embodiments, each of roller modules 160 hingedly jointed to one another in the each of the roller strips 151 forms a rotatable joint 166. With the rotatable joint 166, the transfer plate 120 is able to overcome a height difference between the loading platform 110 and the cargo container 400 (as shown in FIG. 4), and the transfer plate 120 can be conformal to an uneven bottom surface in the cargo container 400. In some examples, the transfer plate 120 may have, for example, eleven rotatable joints 166. However, other numbers of the rotatable joint 166 may also be in the scope of the present invention. The number of the rotatable joint 166 may be adjusted according to utilization requirements or a length of the roller modules 160.

The ramp portion 124 is connected to the rolling portion 122. The ramp portion 124 is disposed on one end 120A of the transfer plate 120. In some embodiments, a length of the ramp portion 124 may be 1000 mm to 2000 mm. In some embodiments, the ramp portion 124 may be formed by a plastic board. In some embodiments, the ramp portion 124 may be an extension of the roller strips 151. That is, the ramp portion 124 is arranged as plastic strips. In some other embodiments, the ramp portion 124 may be a bulk plastic board having a same width as the rolling portion 122.

Figure 3C:
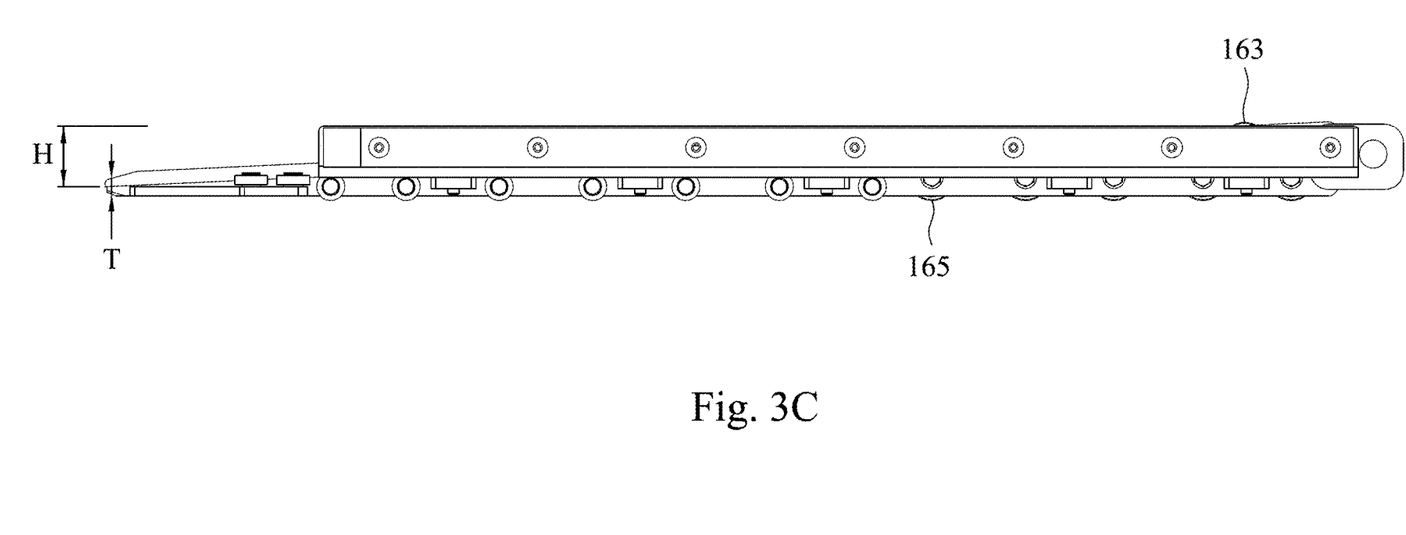
FIG. 3C is a side view of a transfer plate.

FIG. 3C is a side view of a transfer plate. In some embodiments, a height from the ramp portion 124 to the ground may gradually decrease. For example, the height may gradually decrease from a height at a same elevation of the rolling portion 122 to a height H which is about 10 mm to about 25 mm measured from the ground. In some examples, a thickness T of a front end of the ramp portion 124 may be about 5 mm to about 15 mm. When the cargos are being transferred from the transfer plate 120 to the cargo container 400, a height difference of the transfer plate 120 and the cargo container 400 may be reduced by the arrangement of the ramp portion 124, so as to reduce the impacts upon the cargos and avoid damages to the cargos. In some examples, the ramp portion 124 may include a portion of the rolling portion 122 that gradually tilts. In the examples, a thickness of the transfer plate 120 gradually decreases, and only the upper rollers 163 are arranged on the end of the rolling portion 122 that is near the ramp portion 124.

In some embodiments, opposing to the end 120A of the transfer plate 120 having the ramp portion 124, the other end 120B of the transfer plate 120 may be connected to the driving device 113 of the loading platform 110. In some embodiments, when the driving device 113 is the drag chain device, the other end 120B of the transfer plate 120 may be connected and fixed to the at least one drag chain 112 of the drag chain device using a chain-fixing element 168.

In some embodiments, a conveyor 130 may be disposed on the other end 120B of the transfer plate 120 opposing to the ramp portion 124, as shown in FIG. 1 and FIG. 2A. The conveyor 130 includes an electrical roller cylinder 131 and a push bar 133. In some embodiments, the conveyor may further include sensor 135.

In some embodiments, an alignment system 140 may be disposed above the loading platform 110. Specifically, the alignment system 140 may be disposed on a fixed position such that the position of the alignment system 140 does not change due to the position adjustment of the loading platform 110. For example, the alignment system 140 may be disposed on a gantry 142 fixed to the ground. In some embodiments, the alignment system 140 is a laser alignment system, in which it can emit a laser to obtain a relative position of the cargo container 400 and the loading platform 110.

Figure 5:
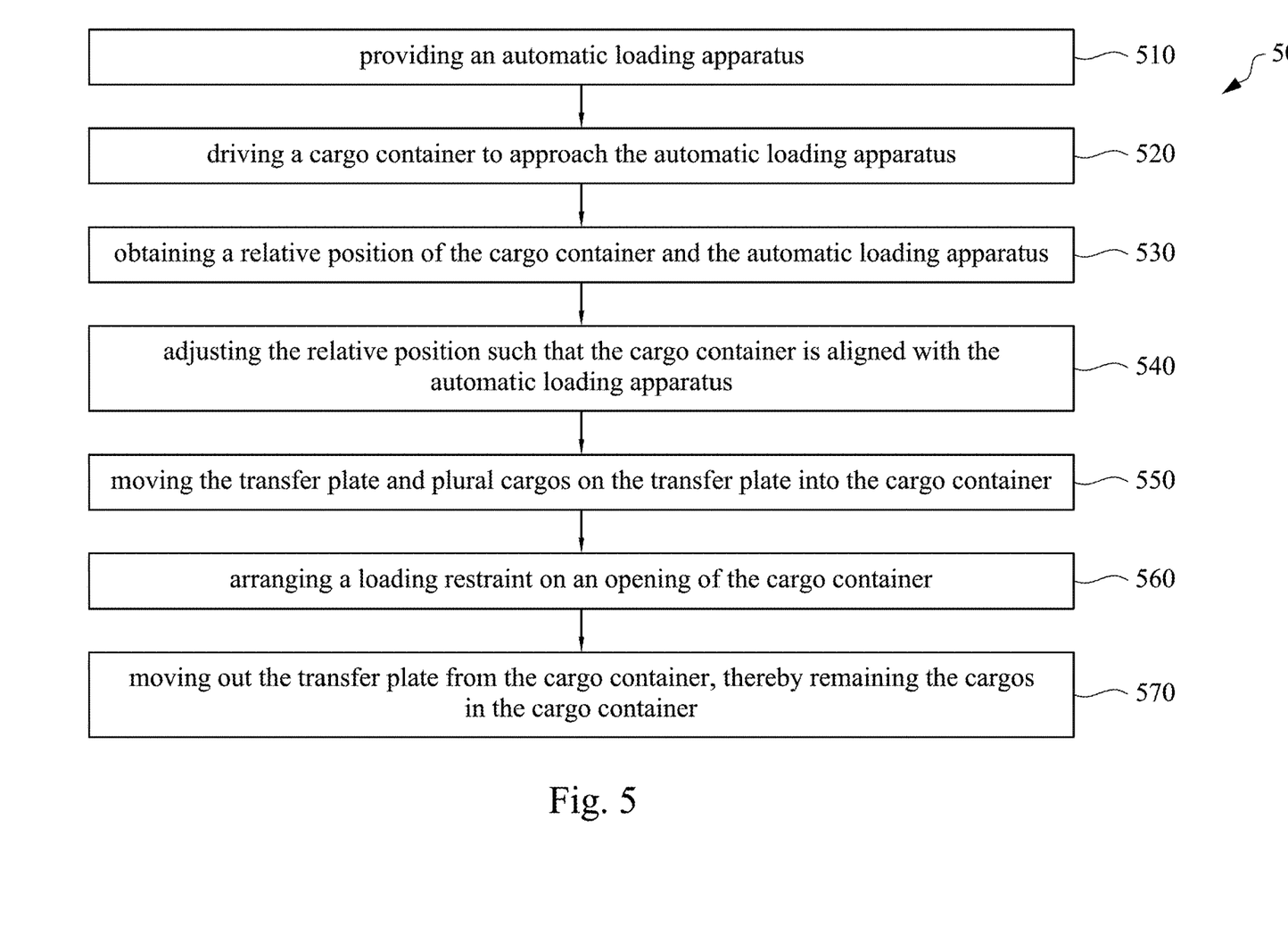
FIG. 5 is a flow chart of a method for loading cargos in accordance with some embodiments of the present invention.

FIG. 4 is a schematic view for loading cargos by an automatic loading apparatus. FIG. 5 is a flow chart of a method for loading cargos in accordance with some embodiments of the present invention. FIG. 4 and FIG. 5 are incorporated herein to describe the method for loading cargos.

At a step 510 of a method 500, an automatic loading apparatus 100 is provided. Then, in some examples, plural cargos 410 may be stacked onto the transfer plate 120 before a step 520 subsequently described. In some embodiments, the cargos 410 may be disposed on a pallet (not shown), and the cargos 410 are then moved onto the transfer plate 120 through the conveyor 130 using the electric roller cylinder 131 and the push bar 133. Specifically, the electric roller cylinder 131 is activated after the sensor 135 of the conveyor 130 detects the cargos 410 and the pallet, so as to transfer the cargos 410 and the pallet forward. Afterward, the push bar 133 is activated when the sensor 135 no longer detects the cargos 410 and the pallet, so as to push the cargos 410 and the pallet onto the transfer plate 120. The above steps are repeated, and the cargos 410 and the pallet on the transfer plate 120 can be pushed by the other cargos behind and moved forward by the upper rollers 163. Therefore, the cargos 410 and the pallet can move along a direction toward the ramp portion 124 and may be arranged on the transfer plate 120 until the rolling portion 122 of the transfer plate 120 is occupied by the cargos 410, or until an amount of the cargos to be loaded is accomplished.

Figure 6:
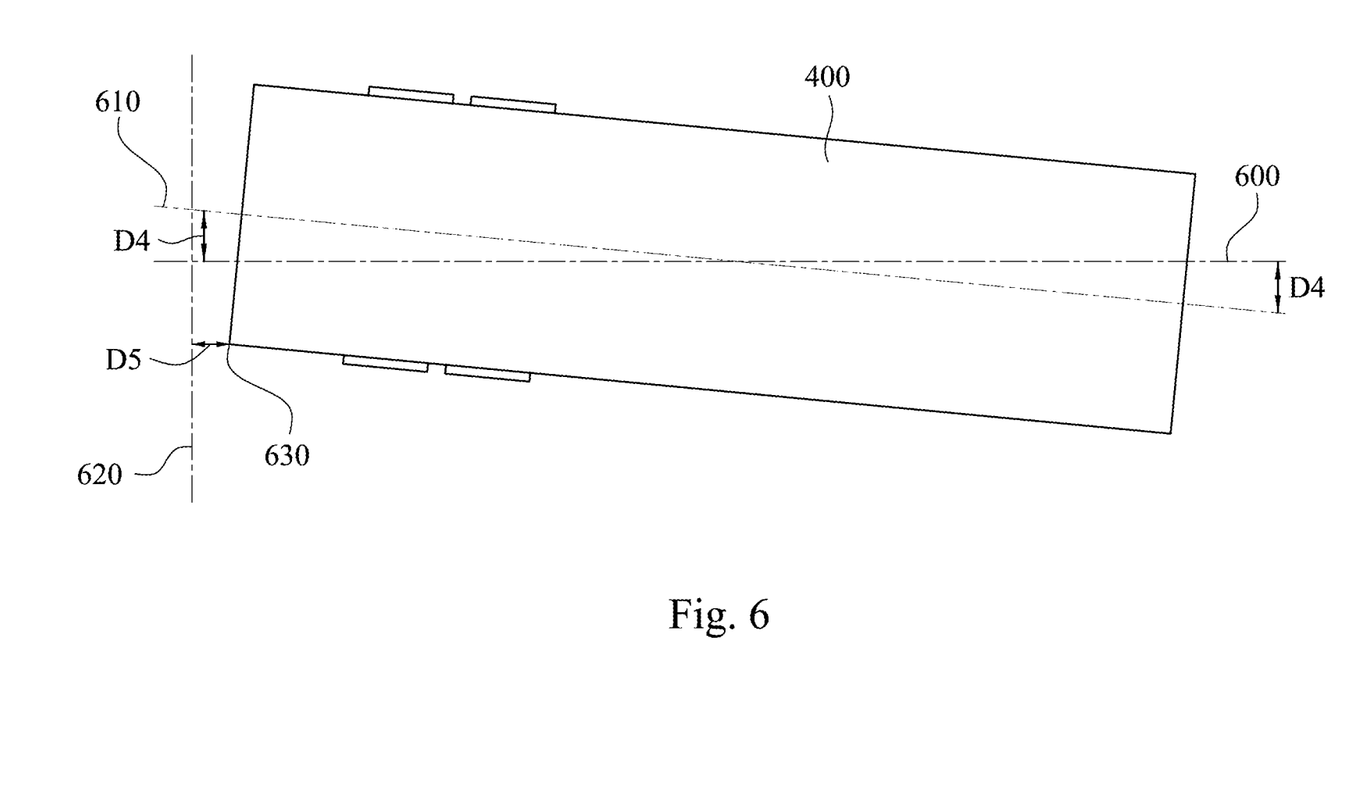
FIG. 6 is a top view of a relative position of a cargo container and an automatic loading apparatus.

Then, as shown in the step 520, the cargo container 400 is driven to approach the automatic loading apparatus 100. The cargo container 400 approaches the end of the transfer plate 120 on which the ramp portion 124 is disposed. In some embodiments, an alignment line may be illustrated on the ground in advance, such that the cargo container 400 can be parked in an area where can be scanned by the alignment system 140. FIG. 6 is a top view of a relative position of a cargo container and an automatic loading apparatus. As shown in FIG. 6, in one example, a distance difference D4 of a longitudinal central line 610 of the cargo container 400 and a central line 600 of the loading platform 110 should be equal to or less than 50 mm. And, a distance difference D5 of an end 630 of the cargo container 400 and the loading platform 110 (e.g. a line 620) is equal to or less than 10 mm. This configuration is advantageous for the scanning of the alignment system 140 and the position adjustment of the loading platform 110. It is noted that the values may be adjusted according to an accuracy of the alignment system, a movable range of the vertically-moving unit or other conditions, and the values are not limited to the values provided in the present invention.

Then, as shown in a step 530, a relative position of the cargo container 400 and the automatic loading apparatus 100 is obtained. In some embodiments, the step 530 is performed by using the alignment system 140 (e.g. the laser alignment system). Specifically, the laser alignment system 140 emits laser on an upper margin and two side margins of the cargo container 400, so as to obtain the relative position of the cargo container 400 and the loading platform 110. If the cargo container 400 is not aligned with the loading platform 110, the alignment system 140 may provide a further instructions to adjust the relative position (i.e. adjusting the position of the cargo container 400 and/or the position of the loading platform 110), as shown in a step 540. In one example, the alignment system 140 can give instructions such that the lateral position of the loading platform 110 is adjusted by the laterally-moving unit 114, and/or the height of the loading platform 110 is adjusted by vertically-moving units 116.

In some other examples, the cargos 410 may be stacked onto the transfer plate 120 between the step 540 and a step 550. The cargos 410 may be stacked according to the above descriptions.

Afterward, in the step 550, the transfer plate 120 and the cargos 410 thereon are driven to move into the cargo container 400. Driving the movement of the transfer plate 120 is performed using the driving device 113, in which the chain 112 of the driving device 113 may be counterclockwise winched first (viewed from the sight S of FIG. 2) such that the transfer plate 120 is pushed into the cargo container 400. In some embodiments, when the cargos 410 and the pallet are being transferred into the cargo container 400, a weight of the cargo container 400 increases, leading to the decrease of the height of the cargo container 400. The height of the loading platform 110 may be adjusted again in real time by the vertically-moving unit 116, so as to reduce the height difference of the loading platform 110 and the cargo container 400. In some embodiments, a portion of the transfer plate 120 does not enter the cargo container 400 after the cargos 410 are transferred into the cargo container 400, as shown in FIG. 4. The transfer plate 120 is simplified in FIG. 4 while it is substantially same as the transfer plate 120 shown in FIG. 3A.

Figure 7:
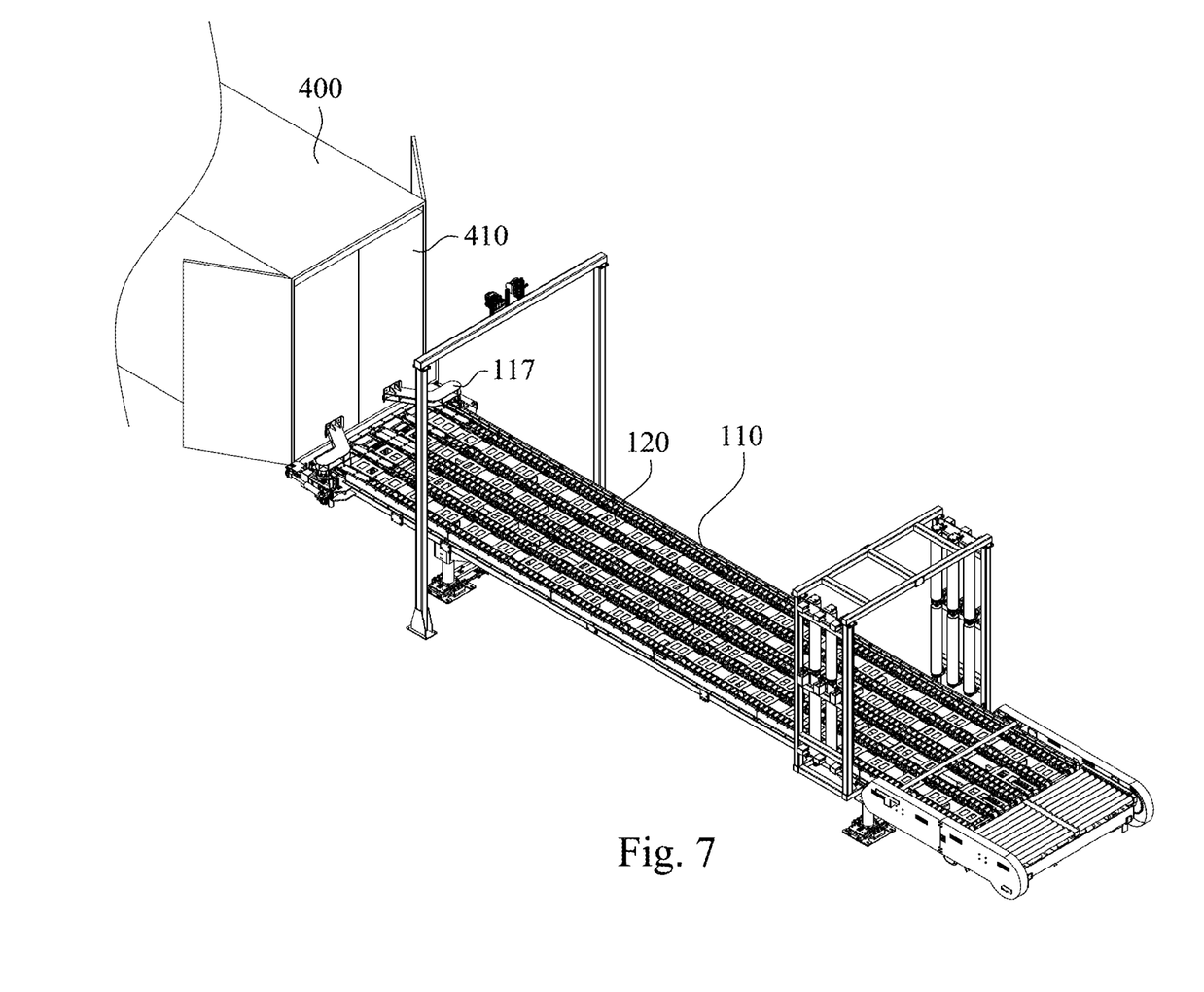
FIG. 7 is a schematic view of the transfer plate moving out from a cargo container.

FIG. 7 is a schematic view of the transfer plate moving out from a cargo container. At a step 560, the loading restraint 117 is arranged on the opening of the cargo container 400 after the cargos 410 or the transfer plate 120 completely enter the cargo container 400, as shown in FIG. 7. In the embodiments, arranging the loading restraint 117 includes rotating the loading restraint 117 (or the cargo restraining arms) to the opening of the cargo container 400.

Next, as shown in a step 570, the transfer plate 120 is driven to move out from the cargo container 400, so as to leave the cargos (and the pallet) in the cargo container 400. Driving the transfer plate 120 to move out may be performed by clockwise winching (viewed from the sight S of FIG. 2) the chain 112 of the driving device 113 such that the transfer plate 120 moves backward.

A personnel cost and a time cost may be effectively reduced by applying the automatic loading apparatus. In addition, a space of the cargo container may be efficiently used by applying the automatic loading apparatus. Loading the cargo container is taken as an example in the present invention, while other embodiments of the present invention may include applying the automatic loading apparatus to load cargos onto other transporting means such as a pallet truck.

Although the present invention has been described in considerable detail with reference to certain embodiments thereof, variations can be made to the structure of the present invention without departing from the scope or spirit of the invention. In view of the foregoing, it is intended that the present invention cover modifications and variations of this invention provided they fall within the scope of the following claims.

What is claimed is:

1. An automatic loading apparatus, comprising:
    a loading platform;
    a transfer plate having an upper surface and a lower surface, wherein the transfer plate is disposed on the loading platform by the lower surface, and the transfer plate comprises:
        a rolling portion, comprising a plurality of roller modules, wherein each of the roller modules comprises a metal frame and a plurality of upper rollers and a plurality of lower rollers disposed in the metal frame, the upper surface is made up of the upper rollers and the lower surface is made up of the lower rollers; and
        a ramp portion, connected to the rolling portion and disposed on one end of the transfer plate; and
    an alignment system, disposed on a support frame and above the loading platform, wherein the alignment system is configured to obtain a relative position of a cargo container and the automatic loading apparatus, and the support frame is not connected to the loading platform, such that the support frame is not moved while a position of a main body portion of the loading platform is adjusted.

2. The automatic loading apparatus of claim 1, wherein a plurality of roller plates are formed from the roller modules, and the roller plates are adjoinedly connected to each other along a direction perpendicular to an extending direction of the transfer plate.

3. The automatic loading apparatus of claim 2, wherein each of the roller plates comprises a plurality of roller strips, each of the roller strips is formed from the roller modules, each of the roller strips is hingedly jointed to one another, and one of the roller strips is fixed to an adjacent one of the roller strips arranged at a distance from the one of the roller strips.

4. The automatic loading apparatus of claim 3, wherein each of the roller modules hingedly jointed to one another in the each of the roller strips forms a rotatable joint.

5. The automatic loading apparatus of claim 1, wherein a length of the ramp portion is 1000 mm to 2000 mm.

6. The automatic loading apparatus of claim 1, wherein the loading platform comprises:
    the main body portion;
    a driving device, disposed in the main body portion, wherein the other end of the transfer plate opposing the ramp portion is connected to the driving device;
    a plurality of devices for adjusting a position of the main body portion, disposed under the main body portion; and
    a loading restraint, disposed on the main body portion near the end of the transfer plate on which the ramp portion is disposed.

7. The automatic loading apparatus of claim 6, wherein each of the devices for adjusting the position of the main body portion comprises:
    a laterally-moving unit; and
    a vertically-moving unit.

8. The automatic loading apparatus of claim 6, wherein the driving device is a drag chain device, the drag chain device comprises at least one drag chain, and the other end of the transfer plate is fixed to the at least one drag chain.

9. The automatic loading apparatus of claim 1, further comprising a conveyor, wherein the conveyor is disposed on the other end of the transfer plate opposing to the ramp portion, and the conveyor comprises a push bar.

10. The automatic loading apparatus of claim 1, wherein the alignment system is configured to emit light on an upper margin and two side margins of the cargo container to obtain the relative position of the cargo container and the automatic loading apparatus.

11. A method of loading cargos, comprising:
    providing the automatic loading apparatus of claim 1;
    driving a cargo container to approach the automatic loading apparatus, wherein the cargo container is located at one end of the transfer plate along an extending direction of the transfer plate;
    using the alignment system to obtain a relative position of the cargo container and the automatic loading apparatus;
    obtaining a relative position of the cargo container and the automatic loading apparatus;
    adjusting the relative position such that the cargo container is aligned with the automatic loading apparatus;
    moving the transfer plate and a plurality of cargos on the transfer plate into the cargo container;
    arranging a loading restraint on an opening of the cargo container; and
    moving out the transfer plate from the cargo container, and, by using the loading restraint, leaving the cargos in the cargo container.

12. The method of claim 11, wherein moving the transfer plate into the cargo container further comprises adjusting a height of the loading platform.

13. The method of claim 11, wherein using the alignment system to obtain the relative position of the cargo container comprises using the alignment system to emit light on an upper margin and two side margins of the cargo container.

* * * * *